(12) United States Patent
Engström et al.

(10) Patent No.: US 10,405,252 B2
(45) Date of Patent: Sep. 3, 2019

(54) CAUSE VALUE ENCODING FOR HANDOVERS IN A WIRELESS COMMUNICATIONS NETWORK

(71) Applicant: Telefonaktiebolaget LM Ericsson (publ), Stockholm (SE)

(72) Inventors: Stefan Engström, Linköping (SE); Angelo Centonza, Stockholm (SE); Martin Israelsson, Spånga (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 134 days.

(21) Appl. No.: 15/117,133

(22) PCT Filed: Feb. 11, 2015

(86) PCT No.: PCT/SE2015/050163
§ 371 (c)(1),
(2) Date: Aug. 5, 2016

(87) PCT Pub. No.: WO2015/122834
PCT Pub. Date: Aug. 20, 2015

(65) Prior Publication Data
US 2016/0353350 A1    Dec. 1, 2016

Related U.S. Application Data

(60) Provisional application No. 61/938,893, filed on Feb. 12, 2014.

(51) Int. Cl.
*H04W 36/00* (2009.01)
*H04W 36/32* (2009.01)
(Continued)

(52) U.S. Cl.
CPC ....... *H04W 36/32* (2013.01); *H04W 36/0055* (2013.01); *H04W 36/0058* (2018.08); *H04W 88/16* (2013.01); *H04W 92/20* (2013.01)

(58) Field of Classification Search
CPC . H04W 36/14; H04W 36/0083; H04W 36/04; H04W 48/16
See application file for complete search history.

(56) References Cited

U.S. PATENT DOCUMENTS

2006/0072506 A1* 4/2006 Sayeedi ............... H04W 36/12
370/331
2006/0229057 A1* 10/2006 Farrugia ............... H04W 24/08
455/403

(Continued)

FOREIGN PATENT DOCUMENTS

EP          1933578      6/2008
EP          2073578      6/2009
WO      WO 2014021758    2/2014

OTHER PUBLICATIONS

3GPP TS 36.413 v12.0.0; Technical Specification; 3rd Generation Partnership Project; Technical Specification Group Radio Access Network; Evolved Universal Terrestrial Radio Access Network (E-UTRAN); S1 Application Protocol (S1AP) (Release 12)—Dec. 2013.

(Continued)

*Primary Examiner* — Khalid W Shaheed
(74) *Attorney, Agent, or Firm* — Sage Patent Group

(57) ABSTRACT

According to an embodiment there is provided a first network node (122) for use in a wireless network (100), the first network node (122) being adapted to forward information on movements of a wireless device to a second network node (124) over an interface (106; 108); wherein the information on movements is represented by a cause value in a first field that uses an interface-dependent encoding and a cause value in a second field that uses an interface-independent encoding. A corresponding second network node and methods of operating the network nodes are also provided.

21 Claims, 13 Drawing Sheets

(51) Int. Cl.
*H04W 92/20* (2009.01)
*H04W 88/16* (2009.01)

(56) References Cited

U.S. PATENT DOCUMENTS

| | | | | |
|---|---|---|---|---|
| 2006/0239258 | A1* | 10/2006 | Kogan | H04L 45/00 370/383 |
| 2008/0043619 | A1* | 2/2008 | Sammour | H04L 1/1685 370/231 |
| 2010/0227621 | A1* | 9/2010 | Wu | H04L 47/745 455/450 |
| 2011/0255506 | A1* | 10/2011 | Toth | H04B 7/18506 370/331 |
| 2012/0020262 | A1* | 1/2012 | Peng | H04W 36/14 370/310 |
| 2012/0094666 | A1* | 4/2012 | Awoniyi | H04W 48/16 455/435.1 |
| 2012/0258719 | A1 | 10/2012 | Fujito et al. | |
| 2015/0296426 | A1* | 10/2015 | Mildh | H04W 36/0055 455/436 |

OTHER PUBLICATIONS

International Search Report for International application No. PCT/SE2015/050163—dated May 19, 2015.
PCT Written Opinion of the International Searching Authority for International application No. PCT/SE2015/050163—dated May 19, 2015.
3GPP TS 36.423 v12.0.0; Technical Specification; 3rd Generation Partnership Project; Technical Specification Group Radio Access Network; Evolved Universal Terrestrial Radio Access Network (E-UTRAN); X2 application protocol (X2AP) (Release 12) Dec. 2013.

* cited by examiner

| IE/Group Name | Presence | Range | IE type and reference | Semantics description |
|---|---|---|---|---|
| Global Cell ID | M | | ECGI 9.2.14 | |
| Cell Type | M | | 9.2.42 | |
| Time UE stayed in Cell | M | | INTEGER (0..4095) | The duration of the time the UE stayed in the cell in seconds. If the UE stays in a cell more than 4095s, this IE is set to 4095. |
| Time UE stayed in Cell Enhanced Granularity | O | | INTEGER (0..40950) | The duration of the time the UE stayed in the cell in 1/10 seconds. If the UE stays in a cell more than 4095s, this IE is set to 40950. |
| HO Cause Value | O | | 9.2.6 | The cause for the handover from the E-UTRAN cell. |

Figure 5

| IE Group Name | Presence | Range | IE type and reference | Semantics description |
|---|---|---|---|---|
| Global Cell ID | M | | E-UTRAN CGI 9.2.1.38 | |
| Cell Type | M | | 9.2.1.66 | |
| Time UE stayed in Cell | M | | INTEGER (0..4095) | The duration of the time the UE stayed in the cell in seconds. If the UE stays in a cell more than 4095s, this IE is set to 4095. |
| Time UE stayed in Cell Enhanced Granularity | O | | INTEGER (0..40950) | The duration of the time the UE stayed in the cell in 1/10 seconds. If the UE stays in a cell more than 4095s, this IE is set to 40950. |
| HO Cause Value | O | | 9.2.1.3 | The cause for the handover from the E-UTRAN cell. |

Figure 7

| HO cause | X2AP index | S1AP index |
|---|---|---|
| Handover Desirable for Radio Reasons | 0 | 16 |
| Time Critical Handover | 1 | 17 |
| Resource Optimisation Handover | 2 | 18 |
| Reduce Load in Serving Cell | 3 | 19 |

Figure 8

| IE/Group Name | Presence | Range | IE type and reference | Semantics description |
|---|---|---|---|---|
| Global Cell ID | M | | ECGI 9.2.14 | |
| Cell Type | M | | 9.2.42 | |
| Time UE stayed in Cell | M | | INTEGER (0..4095) | The duration of the time the UE stayed in the cell in seconds. If the UE stays in a cell more than 4095s, this IE is set to 4095. |
| Time UE stayed in Cell Enhanced Granularity | O | | INTEGER (0..40950) | The duration of the time the UE stayed in the cell in 1/10 seconds. If the UE stays in a cell more than 4095s, this IE is set to 40950. |
| HO Cause Value | O | | 9.2.6 | The cause for the handover from the E-UTRAN cell. |
| HOCause Value2 | O | | reference to common coding | The cause for the handover from the E-UTRAN cell |

Figure 11

| IE/Group Name | Presence | Range | IE type and reference | Semantics description |
|---|---|---|---|---|
| Global Cell ID | M | | E-UTRAN CGI 9.2.1.38 | |
| Cell Type | M | | 9.2.1.66 | |
| Time UE stayed in Cell | M | | INTEGER (0..4095) | The duration of the time the UE stayed in the cell in seconds. If the UE stays in a cell more than 4095s, this IE is set to 4095. |
| Time UE stayed in Cell Enhanced Granularity | O | | INTEGER (0..40950) | The duration of the time the UE stayed in the cell in 1/10 seconds. If the UE stays in a cell more than 4095s, this IE is set to 40950. |
| HO Cause Value | O | | 9.2.1.3 | The cause for the handover from the E-UTRAN cell. |
| HOCause Value2 | O | | reference to common coding | The cause for the handover from the E-UTRAN cell |

Figure 12

CAUSE VALUE ENCODING FOR HANDOVERS IN A WIRELESS COMMUNICATIONS NETWORK

PRIORITY

This nonprovisional application is a U.S. National Stage Filing under 35U.S.C. § 371 of International Patent Application Serial No. PCT/SE 2015/050163 filed Feb. 11, 2015, and entitled "Cause Value Encoding For Handovers In A Wireless Communications Network" which claims priority to U.S. Provisional Patent Application No. 61/938,893 filed Feb. 12, 2014, both of which are hereby incorporated by reference in their entirety.

TECHNICAL FIELD

Particular embodiments are directed to wireless communications and, more particularly, to cause value encoding for handovers in a wireless communications network.

BACKGROUND

In a typical cellular radio system, wireless terminals (also referred to as user equipment unit nodes, UEs, mobile terminals, and/or mobile stations) communicate via a radio access network (RAN) with one or more core networks, which provide access to data networks, such as the Internet, and/or the public-switched telecommunications network (PSTN). The RAN covers a geographical area that is divided into cell areas, with each cell area being served by a radio base station (also referred to as a base station, a RAN node, a "NodeB", and/or evolved NodeB "eNodeB"). A cell area is a geographical area where radio coverage is provided by the base station equipment at a base station site. The base stations communicate through radio communication channels with wireless terminals within range of the base stations.

Cellular communications system operators have begun offering mobile broadband data services based on, for example, WCDMA (Wideband Code Division Multiple Access), HSPA (High Speed Packet Access), and Long Term Evolution (LTE) wireless technologies. In an LTE network, for example, a handover procedure is performed when a wireless device moves from one cell area to another cell area. During handover between cells, a wireless device Information Element (IE) may be forwarded to the target network node. The IE may contain history information that lists cells which the wireless device visited during previous handovers. Information associated with each listed cell may comprise a duration that the cell served the wireless device and a reason for the handover. The reason for the handover may be referred to as the handover (HO) Cause Value. A target network node may use contents of the IE to optimize, e.g., further treatment of the wireless device or handover thresholds to neighbor cells.

Network nodes may use different interfaces, such as X2 or S1, for handover signaling between network nodes. X2 and S1 define HO Cause Value IE as an enumerated value where each enumerated value encoded in the IE is associated to a particular handover cause (i.e. reason for the handover). However, X2 and S1 associate different enumerated HO Cause Values with different handover causes. Because a target node of the handover knows which signaling interface is used, the target node may correctly interpret the current enumerated cause value. However, the history information may also contain cause values associated with prior handovers. A target node may not know what interface previous network nodes used for previous handovers. Thus, the target node may not be able to use the information because it may not be able to correctly interpret the previous cause values.

SUMMARY

Particular embodiments of the present disclosure may relate to handover cause values in a wireless network. For example, when a first network node forwards information on a previous handover, or other movements of a wireless device, to a second network node, the network nodes may use an interface-independent encoding for the cause of the movement. Interface-independent encoding refers to an encoding that is independent of the signaling interface used between the target nodes. An advantage of interface-independent encoding is that it may enable network nodes to exchange unambiguous cause values for previous movements of a wireless device. Interface-independent encoding may also enable mapping of cause values used on one interface to cause values used on a different interface. For example, an identical cause value may be used for different reasons on different interfaces. An interface-independent encoding may enable a mapping between cause values on different interfaces, which may be reported in a wireless device's history information.

According to a first aspect, there is provided a first network node for use in a wireless network, the first network node being adapted to forward information on movements of a wireless device to a second network node over an interface; wherein the information on movements is represented by a cause value in a first field that uses an interface-dependent encoding and a cause value in a second field that uses an interface-independent encoding.

According to a second aspect there is provided a method of operating a first network node in a wireless network, the method comprising forwarding information on movements of a wireless device to a second network node over an interface; wherein the information on movements is represented by a cause value in a first field that uses an interface-dependent encoding and a cause value in a second field that uses an interface-independent encoding.

According to a third aspect there is provided a second network node for use in a wireless network, the second network node being adapted to receive information on movements of a wireless device from a first network node over an interface; wherein the information on movements is represented by a cause value in a first field that uses an interface-dependent encoding and a cause value in a second field that uses an interface-independent encoding.

According to a fourth aspect there is provided a method of operating a second network node in a wireless network, the method comprising receiving information on movements of a wireless device from a first network node over an interface; wherein the information on movements is represented by a cause value in a first field that uses an interface-dependent encoding and a cause value in a second field that uses an interface-independent encoding.

According to a fifth aspect there is provided a computer program product having computer program instructions embodied therein, the computer program instructions being such that, on execution by a suitable processor circuit, the processor circuit is caused to perform either of the methods described above.

BRIEF DESCRIPTION OF THE DRAWINGS

FIG. 5 is a table representing the format of a Last Visited E-UTRAN Cell Information IE used over an X2 interface.

FIG. 7 is a table representing a Last Visited E-UTRAN Cell Information IE used over an S1 interface.

FIG. 8 is a table representing an example enumeration of HO cause values in X2 and S1.

FIG. 11 is a table representing a Last Visited E-UTRAN Cell Information IE used over an X2 interface with a new IE for HO Cause Value 2.

FIG. 12 is a table representing a Last Visited E-UTRAN Cell Information IE used over an S1 interface with a new IE for HO Cause Value 2.

DETAILED DESCRIPTION

Figure 1:
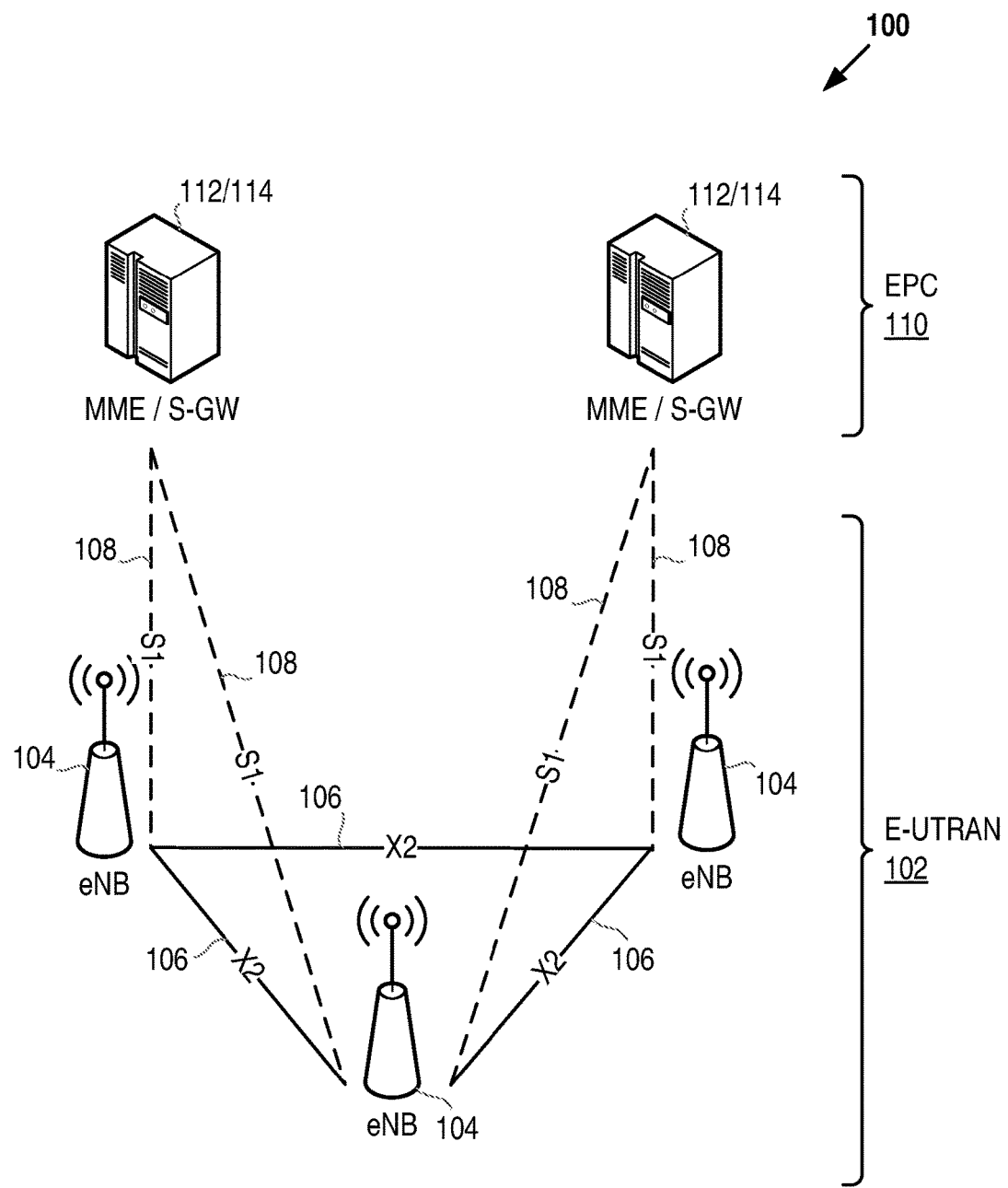
FIG. 1 is a schematic/block diagram illustrating an LTE architecture showing logical interfaces between eNodeBs (X2) and between eNodeBs and mobility management entities (MMEs)/serving gateways (S-GWs) (S1).

Particular embodiments will now be described more fully hereinafter with reference to the accompanying drawings, however, other embodiments may include many different forms and should not be construed as limited to the examples set forth herein. Embodiments of the disclosure need not be mutually exclusive, and components described with respect to one embodiment may be used in another embodiment.

For purposes of illustration and explanation only, particular embodiments are described in the context of operating in a Radio Access Network (RAN) that communicates over radio communication channels with wireless terminals (also referred to as UEs). It will be understood, however, any suitable type of communication network could be used. As used herein, a wireless terminal or UE can include any device that receives data from a communication network, and may include, but is not limited to, a mobile telephone ("cellular" telephone), laptop/portable computer, pocket computer, hand-held computer, desktop computer, a machine to machine (M2M) or machine-type communication (MTC) device, a sensor with a wireless communication interface, etc.

In some embodiments of a RAN, several base stations may be connected (e.g., by landlines or radio channels) to a radio network controller (RNC). A radio network controller, also sometimes termed a base station controller (BSC), may supervise and coordinate various activities of the plural base stations connected thereto. A radio network controller may be connected to one or more core networks. According to some other embodiments of a RAN, base stations may be connected to one or more core networks without a separate RNC(s) therebetween, for example, with functionality of an RNC implemented at base stations and/or core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node Bs and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although certain terminology from 3GPP ($3^{rd}$ Generation Partnership Project) LTE (Long Term Evolution) is used in some example embodiments, this should not be seen as limiting. Other wireless systems, such as WCDMA, HSPA, WiMax (Worldwide Interoperability for Microwave Access), UMB (Ultra Mobile Broadband), HSDPA (High-Speed Downlink Packet Access), GSM (Global System for Mobile Communications), etc., may be used in other embodiments.

Also note that terminology such as base station (also referred to as NodeB, eNodeB, or Evolved Node B) and wireless terminal (also referred to as wireless device, User Equipment node, or UE) should be considered non-limiting and does not imply a certain hierarchical relation between the two. In general, a base station (e.g., a "NodeB" or "eNodeB") and a wireless terminal (e.g., a "UE") may be considered as examples of respective different communications devices that communicate with each other over a wireless radio channel. An example architecture of an LTE system 100 is shown in FIG. 1. Evolved UMTS Terrestrial Radio Access Network (E-UTRAN) 102 includes base stations 104 referred to as evolved NodeBs (eNBs or eNodeBs) that provide E-UTRAN user plane and control plane protocol terminations towards a wireless device (UE). Interface X2 106 connects eNodeBs 104 and provides application layer signaling, X2AP, between eNodeBs 104. X2AP is standardized in 3GPP TS 36.423 v12.0.0. Interface S1 108 connects eNodeBs 104 to the Evolved Packet Core (EPC) 110, and more specifically to the MME (Mobility Management Entity) 112 by means of the S1-MME interface and to the Serving Gateway (S-GW) 114 by means of the S1-U interface. Interface S1 108 supports many-to-many relation between MMEs/S-GWs 112/114 and eNodeBs 104. Interface S1 108 provides application layer signaling, S1AP, between eNodeBs 104 and MMEs/S-GWs 112/114. S1AP is standardized in 3GPP TS 36.413 v12.0.0.

The eNodeB 104 hosts functionalities such as Radio Resource Management (RRM), radio bearer control, admission control, header compression of user plane data towards serving gateway, and/or routing of user plane data towards the serving gateway. The MME 112 is the control node that processes the signaling between the UE and the CN (core network) 110. Significant functions of the MME 112 are related to connection management and bearer management, which are handled via Non Access Stratum (NAS) protocols. The S-GW 114 is the anchor point for UE mobility, and also includes other functionalities such as temporary DL (down link) data buffering while the UE is being paged, packet routing and forwarding to the right eNodeB 104, and/or gathering of information for charging and lawful interception. The PDN Gateway (P-GW)—not shown in FIG. 1—is the node responsible for UE IP (Internet Protocol) address allocation, as well as Quality of Service (QoS) enforcement (as further discussed below).

Figure 2:
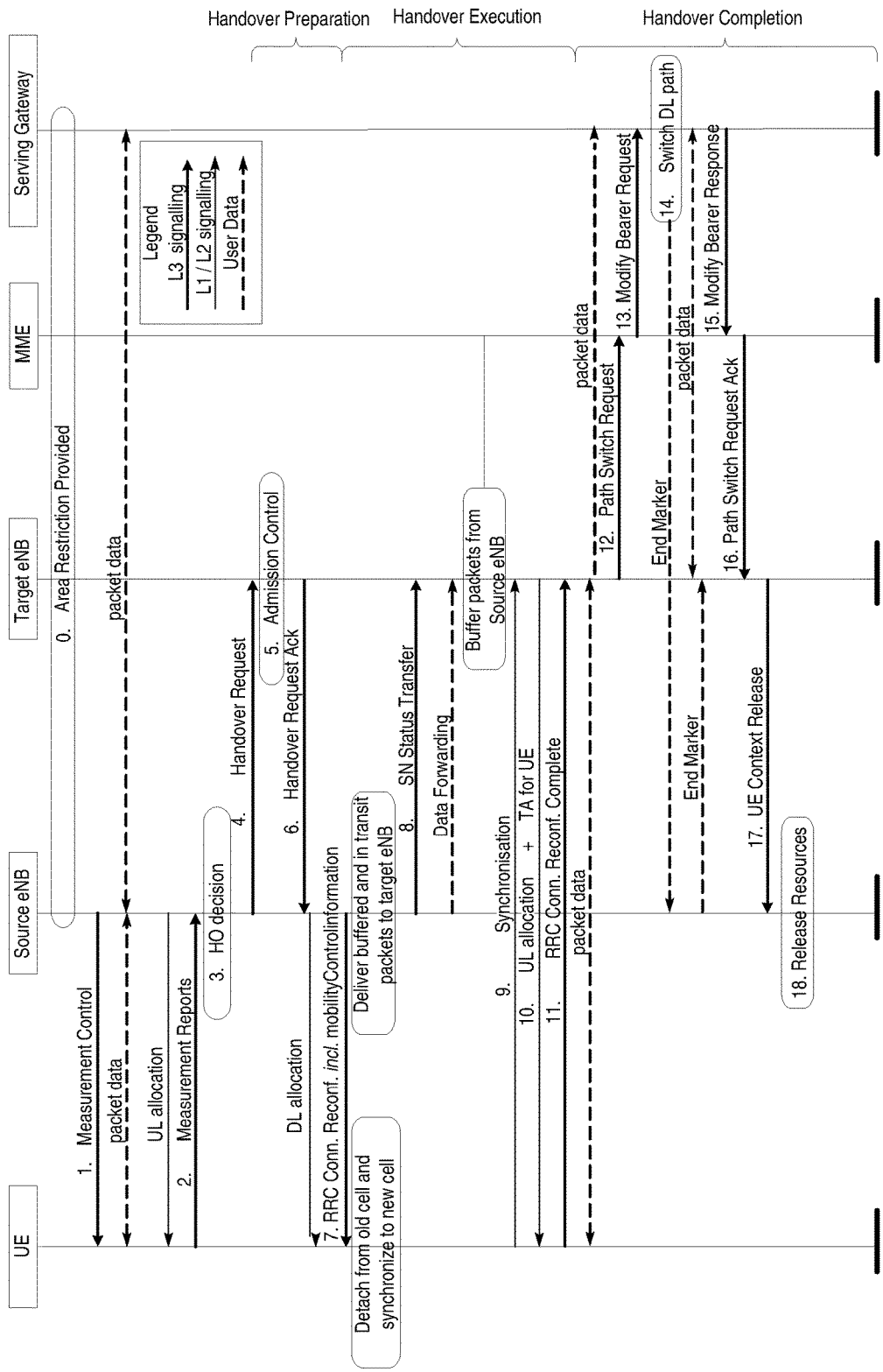
FIG. 2 is a signal flow diagram illustrating an intra MME/S-GW handover procedure.

LTE mobility in connected mode may use X2 based handover or S1 based handover. LTE handover preparation and execution can essentially be completed over the X2 interface 106 without involving the core network 110. However, some details are aligned over S1 108. Handover may also be performed by S1 interfaces 108 forwarded by the MME 112. As one example, FIG. 2 illustrates a handover procedure where neither MME 112 nor S-GW 114 changes due to the handover. FIG. 2 and the following description can be found in 3GPP TS 36.300 v12.0.0.

Control plane steps performed in some embodiments in the intra MME/S-GW handover procedure may comprise:
1 Source eNB configures UE measurement procedures.
2 UE is triggered to send MEASUREMENT REPORT by the rules set by, e.g., system information, specification, etc.
3 Source eNB makes a decision based on MEASUREMENT REPORT and RRM information to hand off the UE.
4 Source eNB issues HANDOVER REQUEST message to Target eNB passing necessary information to prepare a HO at the target side.
5 Target eNB may perform Admission Control.
6 Target eNB prepares HO with L1/L2 and sends HANDOVER REQUEST ACKNOWLEDGE to Source eNB. The HANDOVER REQUEST ACKNOWLEDGE message includes a transparent container with mobilityControlInformation to be sent to UE as an RRC message to perform the handover. The HANDOVER REQUEST ACKNOWLEDGE message includes an Information Element (IE) called "Target eNB to Source eNB Transparent Container". This IE contains the handover command message (RRCConnectionReconfiguration that includes the mobilityControlInfo IE) that is sent to UE in the next step.
   When Source eNB receives the HANDOVER REQUEST ACKNOWLEDGE, or when the transmission of the handover command is initiated in the downlink, user plane data forwarding may be initiated.
7 Source eNB sends RRC message to UE to perform the handover, e.g., the RRCConnectionReconfiguration message that includes the mobilityControlInfo that was received in the transparent container included in the HANDOVER REQUEST ACKNOWLEDGE received from the target.
8 Source eNB sends SN STATUS TRANSFER message to Target eNB.
9 After receiving the RRCConnectionReconfiguration message including the mobilityControlInformation, UE performs synchronisation to Target eNB and accesses the target cell via RACH.
10 Target eNB responds with UL allocation and timing advance.
11 When UE has successfully accessed the target cell, UE sends an RRCConnectionReconfigurationComplete message (C-RNTI) to confirm the handover. Target eNB can now begin sending data to the UE.
12 Target eNB sends PATH SWITCH REQUEST message to MME to inform MME that UE has changed cell.
13 MME sends MODIFY BEARER REQUEST message to Serving Gateway.
14 Serving Gateway switches the downlink data path to the target side. Serving gateway sends one or more "end marker" packets on the old path to Source eNB and then releases any U-plane/TNL resources towards Source eNB.
15 Serving Gateway sends MODIFY BEARER RESPONSE message to MME.
16 MME confirms the PATH SWITCH REQUEST message with PATH SWITCH REQUEST ACKNOWLEDGE message.
17 Target eNB indicates HO success to Source eNB and triggers the release of resources by Source eNB by sending UE CON TEXT RELEASE message.
18 Upon receiving the UE CONTEXT RELEASE message, Source eNB can release radio and C-plane related resources associated with the UE context. Any ongoing data forwarding may continue.

Figure 3:
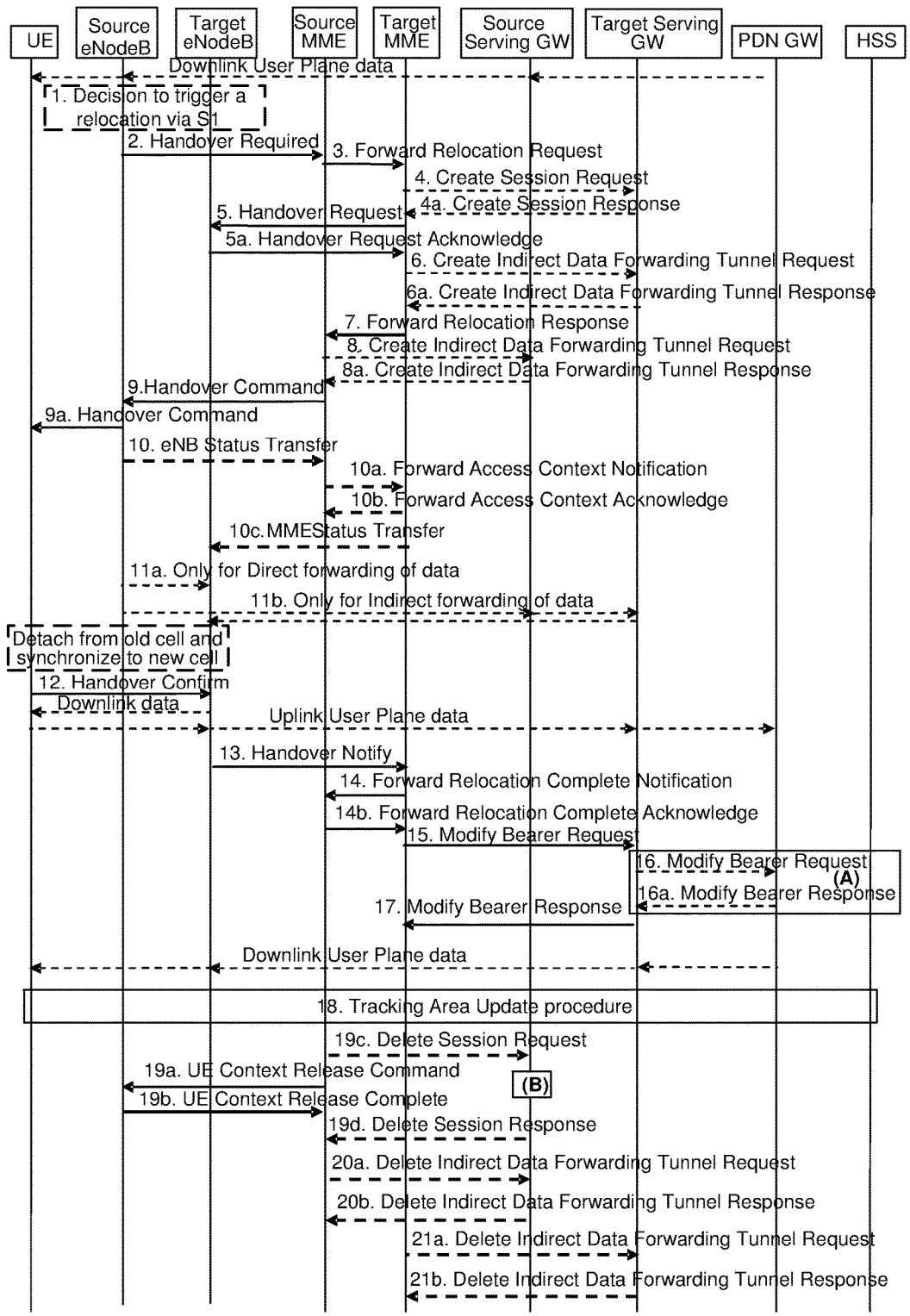
FIG. 3 is a signal flow diagram illustrating an S1-based handover procedure.

As another example, FIG. 3 illustrates an S1-based handover procedure. FIG. 3 and the following description can be found in 3GPP TS23.401 v12.0.0.

Control plane steps performed in some embodiments in the S1-based handover procedure may comprise:
1 Source eNodeB decides to initiate an S1-based handover to Target eNodeB. This can be triggered, e.g., by no X2 connectivity to Target eNodeB, by an error indication from Target eNodeB after an unsuccessful X2-based handover, or by dynamic information learned by Source eNodeB.
2 Source eNodeB sends Handover Required (Direct Forwarding Path Availability, Source to Target transparent container, target eNodeB Identity, CSG ID, CSG access mode, target TAI, S1AP Cause) to Source MME.
3 Source MME selects the target and if it has determined to relocate the MME, it sends a Forward Relocation Request (MME UE context, Source to Target transparent container, RAN Cause, Target eNodeB Identity, CSG ID, CSG Membership Indication, Target TAI, MS Info Change Reporting Action (if available), CSG Information Reporting Action (if available), UE Time Zone, Direct Forwarding Flag, Serving Network) message to Target MME. Target TAI is sent to Target MME to help it to determine whether S-GW relocation is needed (and, if needed, aid S-GW selection). The old Serving Network is sent to Target MME to support Target MME to resolve if Serving Network is changed. In network sharing scenarios, Serving Network may denote the serving core network.
   RAN Cause indicates the S1AP Cause as received from Source eNodeB.
4 If MME has been relocated, Target MME verifies whether Source Serving GW can continue to serve UE. If MME has not been relocated, Source MIME decides on this Serving GW re-selection.
   If Source Serving GW continues to serve the UE, no message is sent in this step.
   In this case, Target Serving GW is identical to Source Serving GW.
   If a new Serving GW is selected, Target MME sends a Create Session Request (bearer context(s) with PDN GW addresses and TEIDs (for GTP-based S5/S8) or GRE keys (for PMIP-based S5/S8) at the PDN GW(s) for uplink traffic, Serving Network, UE Time Zone) message per PDN connection to Target Serving GW. Target Serving GW allocates the S-GW addresses and TEIDs for the uplink traffic on S1_U reference point (one TEID per bearer).
  a.) Target Serving GW sends a Create Session Response (Serving GW addresses and uplink TEID(s) for user plane) message back to Target MME.
5 Target MME sends Handover Request (EPS Bearers to Setup, AMBR, S1AP Cause, Source to Target transparent container, CSG ID, CSG Membership Indication, Handover Restriction List) message to Target eNodeB. This message creates the UE context in Target eNodeB, including information about the bearers and the security context.
  S1AP Cause indicates the RAN Cause as received from Source MME.
  a.) Target eNodeB sends Handover Request Acknowledge (EPS Bearer Setup list, EPS Bearers failed to setup list Target to Source transparent container) message to Target MME. The EPS Bearer Setup list includes a list of addresses and TEIDs allocated at Target eNodeB for downlink traffic on S1-U reference point (one TEID per bearer) and addresses and TEIDs for receiving forwarded data if necessary. If the UE-AMBR is changed, e.g., all the EPS bearers which are associated to the same APN are rejected in Target eNodeB, MME shall recalculate a new UE-AMBR and signal the modified UE-AMBR value to Target eNodeB.
  If none of the default EPS bearers have been accepted by Target eNodeB, Target MME shall reject the handover.
6 If indirect forwarding applies and Serving GW is relocated, Target MME sets up forwarding parameters by sending Create Indirect Data Forwarding Tunnel Request (Target eNodeB addresses and TEIDs for forwarding) to Serving GW.
  a.) Serving GW sends a Create Indirect Data Forwarding Tunnel Response (Target Serving GW addresses and TEIDs for forwarding) to Target MME. If Serving GW is not relocated, indirect forwarding may be set up in step 8 below. Indirect forwarding may be performed via a Serving GW which is different from the Serving GW used as the anchor point for UE.
7 If MME has been relocated, Target MME sends a Forward Relocation Response (Cause, Target to Source transparent container, Serving GW change indication, EPS Bearer Setup List, Addresses and TEIDs) message to Source MME. For indirect forwarding, this message includes Serving GW Address and TEIDs for indirect forwarding (source or target). Serving GW change indication indicates a new Serving GW has been selected.
8 If indirect forwarding applies, Source MME sends Create Indirect Data Forwarding Tunnel Request (addresses and TEIDs for forwarding) to Serving GW. If Serving GW is relocated, the request includes a tunnel identifier to the target serving GW.
  a.) Serving GW responds with a Create Indirect Data Forwarding Tunnel Response (Serving GW addresses and TEIDs for forwarding) message to Source MME.
  Indirect forwarding may be performed via a Serving GW which is different from the Serving GW used as the anchor point for UE.
9 Source MME sends a Handover Command (Target to Source transparent container, Bearers Subject to Forwarding, Bearers to Release) message to Source eNodeB. The Bearers Subject to Forwarding includes list of addresses and TEIDs allocated for forwarding. The Bearers to Release includes the list of bearers to be released.
  a.) The Handover Command is constructed using the Target to Source transparent container and is sent to UE. Upon reception of this message, UE will remove any EPS bearers for which it did not receive the corresponding EPS radio bearers in the target cell.
10 Source eNodeB sends an eNodeB Status Transfer message to Target eNodeB via the MME(s) to convey the PDCP and HFN status of the E-RABs for which PDCP status preservation applies. Source eNodeB may omit sending this message if none of the E-RABs of UE shall be treated with PDCP status preservation.
  a.) If there is MME relocation, Source MME sends this information to the target MME via a Forward Access Context Notification message.
  b.) Target MME acknowledges with a Forward Access Context.
  c.) Source MME or, if the MME is relocated, Target MME, sends the information to Target eNodeB via an MME Status Transfer message.
11 Source eNodeB should start forwarding of downlink data from Source eNodeB towards Target eNodeB for bearers subject to data forwarding. This may be either direct (step 11a) or indirect forwarding (step 11b).
12 After UE has successfully synchronized to the target cell, it sends a Handover Confirm message to Target eNodeB. Downlink packets forwarded from Source eNodeB can be sent to UE. Also, uplink packets can be sent from UE, which are forwarded to Target Serving GW and on to PDN GW.
13 Target eNodeB sends a Handover Notify (TAI+ECGI) message to Target MME.
14 If the MME has been relocated, Target MME sends a Forward Relocation Complete Notification message to Source MME.
  b.) Source MME, in response, sends a Forward Relocation Complete Acknowledge message to the target MME. Regardless of whether MME has been relocated, a timer in Source MME is started to supervise when resources in Source eNodeB and, if Serving GW is relocated, also resources in Source Serving GW shall be released.
  Upon receipt of the Forward Relocation Complete Acknowledge message, Target MME starts a timer if Target MME allocated S-GW resources for indirect forwarding.
15 MME sends a Modify Bearer Request (eNodeB address and TEID allocated at the target eNodeB for downlink traffic on S1-U for the accepted EPS bearers, ISR Activated) message to Target Serving GW for each PDN connection, including the PDN connections that need to be released. If PDN GW requested UE's location and/or User CSG information (determined from the UE context), MME also includes the User Location Information IE and/or User CSG Information IE in this message. If the UE Time Zone has changed, MME includes the UE Time Zone IE in this message. If Serving GW is not relocated but the Serving Network has changed or if MME has not received any old Serving Network information from the old MME, MME includes the Serving Network IE in this message.

For the case that neither MME nor S-GW changed, if ISR was activated before this procedure, MME should maintain ISR. UE is informed about the ISR status in the Tracking Area Update procedure. If Serving GW supports Modify Access Bearers Request procedure and if there is no need for the S-GW to send the signalling to the PGW, MME may send Modify Access Bearers Request (eNodeB address and TEID allocated at Target eNodeB for downlink traffic on S1 U for the accepted EPS bearers, ISR Activated) per UE to Serving GW to optimize the signalling.

16 If Serving GW is relocated, Target Serving GW assigns addresses and TEIDs (one per bearer) for downlink traffic from PDN GW. It sends a Modify Bearer Request (Serving GW addresses for user plane and TEID(s), Serving Network) message per PDN connection to PDN GW(s). Serving GW also includes User Location Information IE and/or UE Time Zone IE and/or User CSG Information IE if they are present in step 15. Serving GW allocates DL TEIDs on S5/S8 even for non-accepted bearers. PDN GW updates its context field and returns a Modify Bearer Response (Charging Id, MSISDN) message to Target Serving GW. The MSISDN is included if PDN GW has it stored in its UE context. PDN GW starts sending downlink packets to the Target GW using the newly received address and TEIDs. These downlink packets will use the new downlink path via the target Serving GW to Target eNodeB.

If Serving GW is not relocated, but has received the User Location Information IE and/or UE Time Zone IE and/or User CSG Information IE and/or Serving Network IE from MME in step 15, Serving GW shall inform PDN GW(s) about these information that e.g. can be used for charging, by sending the message Modify Bearer Request (User Location Information IE, UE Time Zone IE, User CSG Information IE, Serving Network IE) to the PDN GW(s) concerned. A Modify Bearer Response message is sent back to Serving GW.

If Serving GW is not relocated and it has not received User Location Information IE nor UE Time Zone IE nor User CSG Information IE nor Serving Network IE from MME in step 15, no message is sent in this step and downlink packets from Serving GW are immediately sent to Target eNodeB.

17 Serving GW shall return a Modify Bearer Response (Serving GW address and TEID for uplink traffic) message to MME as a response to a Modify Bearer Request message, or a Modify Access Bearers Response (Serving GW address and TEID for uplink traffic) as a response to a Modify Access Bearers Request message. If Serving GW cannot serve the MME Request in the Modify Access Bearers Request message without S5/S8 signalling or without corresponding Gxc signalling when PMIP is used over the S5/S8 interface, it shall respond to MME with indicating that the modifications are not limited to S1-U bearers, and MME shall repeat its request using Modify Bearer Request message per PDN connection.

If Serving GW does not change, Serving GW shall send one or more "end marker" packets on the old path immediately after switching the path in order to assist the reordering function in Target eNodeB.

18 UE initiates a Tracking Area Update procedure when one of the conditions listed in clause "Triggers for tracking area update" applies.

Target MME knows that the procedure is a Handover procedure that has been performed for this UE because it received the bearer context(s) by handover messages and therefore Target MME performs only a subset of the TA update procedure. Specifically, Target MME excludes the context transfer procedures between Source MME and Target MME.

19 When the timer started in step 14 expires, Source MME sends a UE Context Release Command message to Source eNodeB. Source eNodeB releases its resources related to UE and responds with a UE Context Release Complete message. When the timer started in step 14 expires and if Source MME received the Serving GW change indication in the Forward Relocation Response message, it deletes the EPS bearer resources by sending Delete Session Request (Cause, LBI, Operation Indication) messages to Source Serving GW. The operation Indication flag is not set, which indicates to Source Serving GW that Source Serving GW shall not initiate a delete procedure towards PDN GW. Source Serving GW acknowledges with Delete Session Response messages. If ISR has been activated before this procedure, the cause indicates to Source GW that Source GW shall delete the bearer resources on the other old CN node by sending Delete Bearer Request message(s) to that CN node.

20 If indirect forwarding was used, then the expiry of the timer at Source MME started at step 14 triggers Source MME to send a Delete Indirect Data Forwarding Tunnel Request message to the Source Serving GW to release the temporary resources used for indirect forwarding that were allocated at step 8.

21 If indirect forwarding was used and Serving GW is relocated, then the expiry of the timer at target MME started at step 14 triggers Target MME to send a Delete Indirect Data Forwarding Tunnel Request message to Target Serving GW to release temporary resources used for indirect forwarding that were allocated at step 6.

Figure 4:
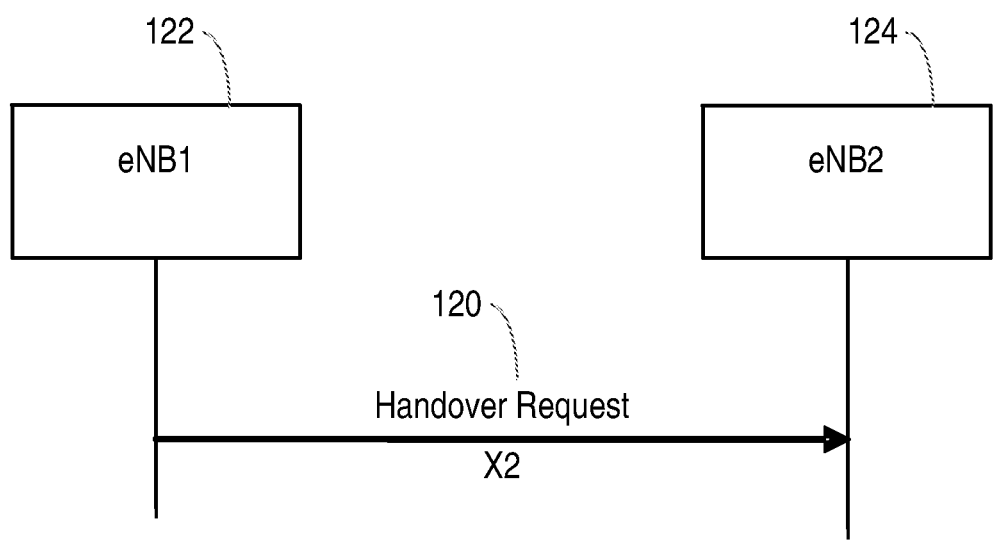
FIG. 4 is a signal flow diagram illustrating an eNB sending a Handover Request message to another eNB over an X2 interface.

As noted above, during handover between cells, a wireless device Information Element (IE) may be forwarded to the target network node. The IE may contain history information that lists cells which the wireless device visited during previous handovers. Information associated with each listed cell may comprise a duration that the cell served the wireless device and a reason for the handover. The reason for the handover may be referred to as the handover (HO) Cause Value. A target network node may use contents of the IE to optimize, e.g., further treatment of the wireless device or handover thresholds to neighbor cells. Information about a wireless device's previous movements may be included in a Last Visited E-UTRAN Cell Information IE contained in a Handover Request message 120 transmitted over an X2 interface from a first eNB 122 to a second eNB 124 (see TS36.423 v12.0.0), as illustrated in FIG. 4.

The information about a wireless device's previous movements may comprise information about the cause of a handover of a UE and may be contained in a HO Cause Value IE, encoded according to a definition in 3GPP TS 36.423 v12.0.0. An example of a Last Visited E-UTRAN Cell Information IE used over an X2 interface according to 3GPP TS 36.423 v12.0.0, section 9.2.40 is shown in FIG. 5.

Figure 6:
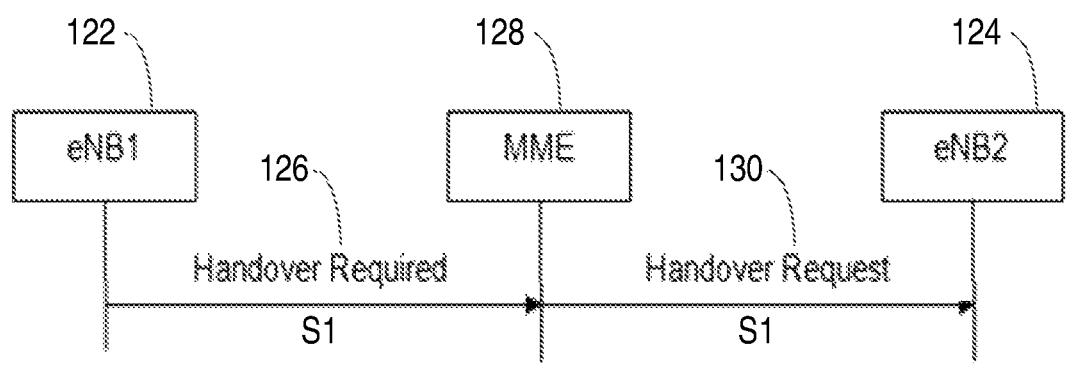
FIG. 6 is a signal flow diagram illustrating an eNB sending a Handover Required message to an MME and the MME sending a Handover Request message to another eNB over an S1 interface.

The information on previous movements may also or alternatively be included in a Last Visited E-UTRAN Cell Information IE, contained in a Handover Required message 126 from a first eNB 122 to an MME 128 or a Handover Request message 130 from the MME 128 over an S1 interface, as shown in FIG. 6.

The information may be information about the cause of the handover of a UE from the first eNB 122 to the second eNB 124 and may be contained in a HO Cause Value IE, coded according to a definition in 3GPP TS 36.413 v12.0.0. An example of a Last Visited E-UTRAN Cell Information IE used over an S1 interface (and as defined in 3GPP TS 36.413 v12.0.0, section 9.2.1.43a) is shown in FIG. 7.

As noted above, X2 and S1 associate different enumerated HO Cause Values with different handover causes. Because a target node of the handover knows which signaling interface is used, the target node may correctly interpret the current enumerated cause value. However, the history information may also contain cause values associated with prior handovers. A target node may not know what interface previous network nodes used for previous handovers.

Thus, the target node may not be able to use the information because it may not be able to correctly interpret the previous cause values. Example methods for disambiguation of cause values in a wireless device's handover history are described below.

1) Re-Encoding of HO Cause Values According to the Last Interface Used This example approach assumes that a source eNB re-encodes all of a UE's history information before handing the UE over to a target eNB. If the HO is over an X2 interface, all the causes in the UE history are re-encoded according to X2AP, irrespective of interfaces associated with prior HOs. Similarly, if the HO is over an S1 interface, all the HO causes in the UE history are encoded according to S1AP, irrespective of any interfaces associated with prior HOs. In this example, the target eNB assumes that the source eNB has re-encoded the cause values. Therefore, this example may be better suited for an intra-vendor environment instead of an inter-vendor environment.

2) Re-Encoding or Interpreting According to One of the Interfaces: X2 More Often Used, S1 Related to Agreed Scenario This example approach is similar to example 1 above, except that past UE history is always encoded according to either of the interfaces, irrespective of the last HO. This approach also requires re-encoding, but only for the last HO, if any. Similar to example 1, the target eNB assumes that the source eNB has re-encoded the cause values and therefore, this approach may be better suited for an intra-vendor environment instead of an inter-vendor environment.

3) Detection Based on Values of Typical HO Causes

This example approach does not use information about a neighbor eNB's implementation and, therefore, may be deployed in an inter-vendor environment. This example approach uses the fact that, X2 and S1 may enumerate HO causes with different values. For example, FIG. 8 illustrates an example enumeration of HO cause values in X2 and S1.

Referring to the example in FIG. 8, an eNB reading a cause value history may assume an X2AP encoding was used if a cause value is in the range 0-3. If the cause value is in the range 16-19, the eNB may assume an S1AP encoding was used. This example approach enables an eNB to determine the correct HO cause without knowledge of the source eNB's implementation. However, some implementations may use "Unspecified" as a HO cause value. For example, S1AP may use index 0 for "Unspecified" which overlaps with an X2 index value in FIG. 8. Also, such an approach may limit usage of other enumerated causes in the future.

The three example approaches listed above are all implementation dependent. The examples described below are standards based.

4) Fixing an Implementation to One Variant

The first 2 implementation-based approaches above assume that re-encoding of a UE's HO history is done according to either a selected AP, or the AP used for the last HO. Similar results may be achieved with a standard-based approach. In such an example approach, the encoding may be defined as part of a standard (3GPP stage-2 specification may be sufficient). This approach may not be backward-compatible.

5) Use Only One Cause Value Encoding in E-UTRAN Visited Cell Information

This example approach may only list one encoding in a 3GPP stage-3 definition of the last visited cell information for E-UTRAN. This approach may encode an HO cause according to S1, even if the HO is executed over X2. Alternatively, this approach may choose an X2 encoding as the standard, or a new encoding. This approach may not be backward-compatible.

6) Add an HO Interface Flag to the History Info

In this example approach, a flag is added to the UE history information to indicate which AP encoding is used. This example removes cause value ambiguity and, if it is not fixed with actual interface used for the HO, it is also compatible with any current implementation of the storage and encoding of past entries in the history list.

The examples listed above may not be capable of flagging the cause value of one particular interface and, therefore, may be unable to avoid re-encoding of existing cause values in UE history information. In addition, the examples listed above may not be able to map cause values between the two interfaces.

Therefore, particular embodiments of the present disclosure may relate to handover cause values in a wireless network. For example, when a first network node forwards information on a previous handover, or other movements of a wireless device, to a second network node, the network nodes may use an interface-independent encoding for the cause of the movement. Interface-independent encoding refers to an encoding that is independent of the signaling interface used between the target nodes.

Particular embodiments may provide advantages over the examples described above. For example, an advantage of interface-independent encoding is that it may enable network nodes to exchange unambiguous cause values for previous movements of a wireless device. Interface-independent encoding may also enable mapping of cause values used on one interface to cause values used on a different interface. For example, an identical cause value may be used for different reasons on different interfaces. An interface-independent encoding may enable a mapping between cause values on different interfaces, which may be reported in a wireless device's history information. In particular embodiments, interface-independent encoding information may be included in addition to existing interface-dependent cause information to provide backwards compatibility. For example, in handovers between eNBs in a 3GPP E-UTRAN system, an additional IE may be added to the UE History Information.

Figure 9:
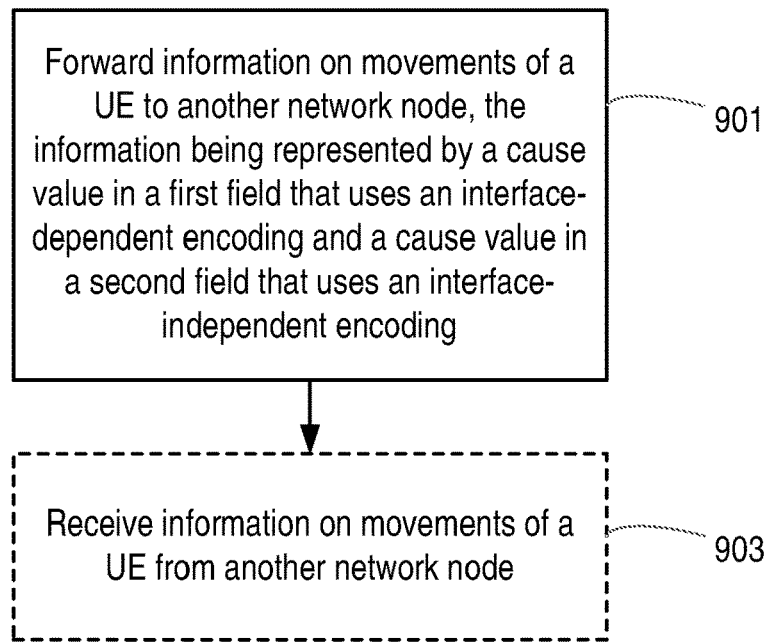
FIG. 9 is a flow chart illustrating a method of operating a network node.

FIG. 9 illustrates a method of operating a first network node according to an embodiment. In step 901 the network node forwards information on movements of a wireless device to a second network node over an interface. The information on movements is represented by a cause value in a first field that uses an interface-dependent encoding and a cause value in a second field that uses an interface-independent encoding. Step 901 can be performed during a handover of the wireless device (UE) from the first network node to the second network node and the information can relate to the current handover and/or previous handovers. In some embodiments the first network node and second network node are nodes in the RAN of the wireless network and the information is forwarded over an inter-RAN node interface (e.g. X2). In other embodiments the first network node and second network node are nodes in the RAN of the wireless network and the information is forwarded from the first network node to a second network node via a network node in the core network through interfaces with the core network node (e.g. S1). In other embodiments the first network node is a node in the core network, the second network node is a node in the RAN and the information is forwarded over a RAN-CN node interface (e.g. S1).

In some embodiments the method further comprises the step (step 903) of receiving information on movements of a wireless device from another network node over an interface. This information on movements is also represented by a cause value in a first field that uses an interface-dependent encoding and a cause value in a second field that uses an interface-independent encoding. This receiving step (step 903) can occur before and/or after the step of forwarding.

Figure 10:
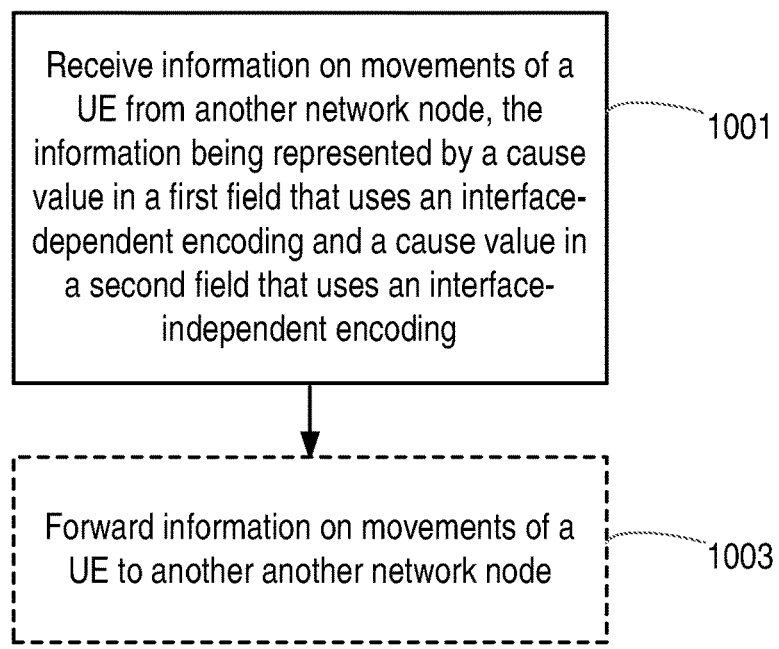
FIG. 10 is a flow chart illustrating another method of operating a network node.

FIG. 10 illustrates a method of operating a second network node according to an embodiment. In step 1001 the network node receives information on movements of a wireless device from a first network node over an interface. The information on movements is represented by a cause value in a first field that uses an interface-dependent encoding and a cause value in a second field that uses an interface-independent encoding. Step 1001 can be performed during a handover of the wireless device (UE) from the first network node to the second network node and the information can relate to the current handover and/or previous handovers. In some embodiments the first network node and second network node are nodes in the RAN of the wireless network and the information is received over an inter-RAN node interface (e.g. X2). In other embodiments the first network node and second network node are nodes in the RAN of the wireless network and the information is received at the second network node from the first network node via a network node in the core network through interfaces with the core network node (e.g. S1). In other embodiments the second network node is a node in the core network, the first network node is a node in the RAN and the information is received over a RAN-CN node interface (e.g. S1).

In some embodiments the method further comprises the step (step 1003) of forwarding information on movements of a wireless device to another network node over an interface. This information on movements is also represented by a cause value in a first field that uses an interface-dependent encoding and a cause value in a second field that uses an interface-independent encoding. The information that is forwarded in step 1003 can be the information received in step 1001.

Particular embodiments may be described in relation to handover signalling over X2 and S1 interfaces in a 3GPP E-UTRAN system. One of skill in the art will recognize that any suitable type of communication network may be used and that interface-independent encoding can be used in any suitable type of communication network.

In some embodiments, as described above, a HO Cause Value may be encoded either according to X2 or S1 interfaces. Because a Handover Request or an Handover Required message may contain a list of previously visited cells, and while an eNB may know the interface, X2 or S1, used for signalling a current handover, the eNB may not be able to determine an encoding used for a particular prior handover.

Some embodiments introduce a second handover cause value field that always uses the same encoding, regardless of the interface used. Existing fields may remain for backwards compatibility. As examples, the new field may be introduced as shown in FIG. 11 and FIG. 12 for X2 and S1 respectively. The new field is shown as "HO Cause Value2" in FIGS. 11 and 12. Encoding for the new field may be according to the encoding of existing HO Cause Values in either X2 or S1, or in any other way (provided that the same encoding is used in the X2 "HO Cause Value2" field as the S1 "HO Cause Value2" field). For example an encoding could be used that is not specific to any particular interface but is interface independent and event dependent. Such new fields may for example have code points reserved over any interface they would be transferred across) FIG. 11 and FIG. 12 refer to the encoding for this new field in the general sense as "reference to common coding."

In some embodiments, the new cause value IE (HO Cause Value2) may be encoded according to the existing X2 or S1 cause values (i.e. the HO Cause Value2 field in both the X2 and S1 "Last Visited E-UTRAN Cell Information" IEs uses the same encoding, either X2 or S1). For example, if the new cause value IE is used to encode cause values using the X2 cause values, the field can represent the mapping between S1 cause values and X2 cause values. The cause value used for handover in Si may not necessarily be the same as the cause value that would have been used for the same HO in X2. This is because cause values may be used for different HO reasons over each interface. In the latter example (where the X2 encoding is used as the interface-independent encoding), the new IE (the HO Cause Value2 in the S1 Last Visited E-UTRAN Cell Information IE) may indicate to the X2 application protocol the cause value that would be used over X2 if the S1 handover had to be performed. In some embodiments if the handover occurs over an X2 interface, the new IE may be omitted from the X2 Last Visited E-UTRAN Cell Information IE or it may indicate a different cause value from what reported in the existing HO Cause Value IE. The latter example may be advantageous in multi-vendor scenarios where a cause used by one vendor is equivalent to a different cause used by a different vendor.

In some embodiments, a new IE may be added to an X2 HO REQUEST or to a S1 HO REQUIRED and S1 HO REQUEST to indicate that the UE History Information IE has been encoded according to a specific interface. The latter indication may indicate that the UE History Information has been encoded according to the last interface used for HO.

One possible way to include this new IE in the S1 HO REQUIRED message and S1 HO REQUEST message is shown below:

---

HO Required / HO Request
   Source to Target Transparent Container
      Source eNB to Target eNB Transparent Container
         UE History Information
         UE History Information Encoding

--- where the UE History Information Encoding IE indicates the encoding used for the UE History Information IE (which includes the HO Cause Value fields).

One possible way to include this new IE in the X2 HO REQUEST message is shown below:

```
HO Request
    UE History Information
        UE History Information Encoding
``` where the UE History Information Encoding IE indicates the encoding used for the UE History Information IE (which includes the HO Cause Value fields).

The UE History Information IE may include information about the last visited cells and HO causes as shown below:

```
UE History Information
Last Visited Cell List
    Last Visited Cell Information
        E-UTRAN Cell
            Last Visited E-UTRAN Cell Information
                Global Cell ID
                Cell Type
                Time UE stayed in Cell
                    Time UE stayed in Cell Enhanced
                Granularity
                HO Cause Value
```

In a preferred embodiment, an extra IE (the HO Cause Value2 IE) is added to the Last Visited E-UTRAN Cell Information IE contained in the UE History Information IE, indicating the encoding according to the X2 interface, which is the interface mostly used for handovers in LTE.

This IE (the HO Cause Value2 IE) can be optional and only present when the HO is not carried out over X2. In this way it is possible to minimise the amount of information added to the UE History Information IE because the new IE can be omitted in most of the cases, namely it can be omitted every time the HO occurs over the X2 interface.

In fact, for those eNBs where the HO only occurs over X2, e.g. clusters of eNBs connecting to the same MME pool and connected amongst each other via the X2 interface, it may be even possible to omit support of such IE.

Hardware Implementations

Figure 13:
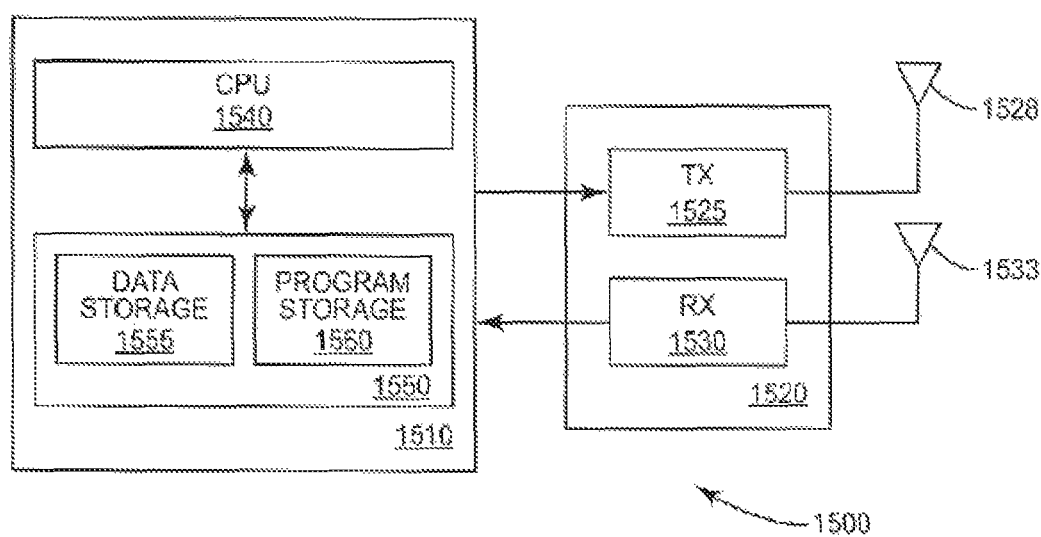
FIG. 13 is a block diagram illustrating elements of an example mobile terminal (such as a UE), according to some embodiments.

Several of the techniques and methods described above may be implemented using radio circuitry and electronic data processing circuitry provided in a terminal. FIG. 13 illustrates features of an example terminal 1500 according to several embodiments of the present invention. Terminal 1500, which may be a UE configured for dual-connectivity operation with an LTE network (E-UTRAN), for example, comprises a transceiver unit 1520 for communicating with one or more base stations as well as a processing circuit 1510 for processing the signals transmitted and received by the transceiver unit 1520. Transceiver unit 1520 includes a transmitter 1525 coupled to one or more transmit antennas 1528 and receiver 1530 coupled to one or more receiver antennas 1533. The same antenna(s) 1528 and 1533 may be used for both transmission and reception. Receiver 1530 and transmitter 1525 use known radio processing and signal processing components and techniques, typically according to a particular telecommunications standard such as the 3GPP standards for LTE. Note also that transmitter unit 1520 may comprise separate radio and/or baseband circuitry for each of two or more different types of radio access network, such as radio/baseband circuitry adapted for E-UTRAN access and separate radio/baseband circuitry adapted for Wi-Fi access. The same applies to the antennas—while in some cases one or more antennas may be used for accessing multiple types of networks, in other cases one or more antennas may be specifically adapted to a particular radio access network or networks. Because the various details and engineering tradeoffs associated with the design and implementation of such circuitry are well known and are unnecessary to a full understanding of the invention, additional details are not shown here.

Processing circuit 1510 comprises one or more processors 1540 coupled to one or more memory devices 1550 that make up a data storage memory 1555 and a program storage memory 1560. Processor 1540, identified as CPU 1540 in FIG. 13, may be a microprocessor, microcontroller, or digital signal processor, in some embodiments. More generally, processing circuit 1510 may comprise a processor/firmware combination, or specialized digital hardware, or a combination thereof. Memory 1550 may comprise one or several types of memory such as read-only memory (ROM), random-access memory, cache memory, flash memory devices, optical storage devices, etc. Because terminal 1500 supports multiple radio access networks, processing circuit 1510 may include separate processing resources dedicated to one or several radio access technologies, in some embodiments. Again, because the various details and engineering tradeoffs associated with the design of baseband processing circuitry for mobile devices are well known and are unnecessary to a full understanding of the invention, additional details are not shown here.

Typical functions of the processing circuit 1510 include modulation and coding of transmitted signals and the demodulation and decoding of received signals. In several embodiments of the present invention, processing circuit 1510 is adapted, using suitable program code stored in program storage memory 1560, for example, to carry out one of the techniques described above for access network selection. Of course, it will be appreciated that not all of the steps of these techniques are necessarily performed in a single microprocessor or even in a single module.

Figure 14:
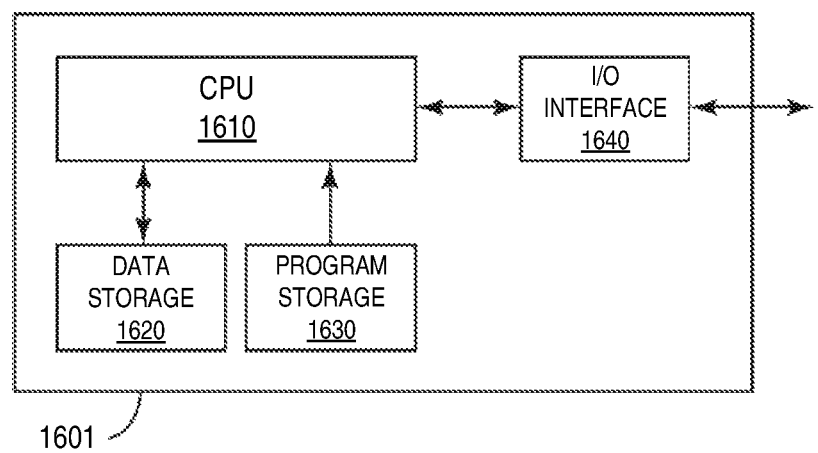
FIG. 14 is a block diagram illustrating elements of an example wireless network node (such as an eNB), according to some embodiments.

Similarly, several of the techniques and processes described above can be implemented in a network node, such as an eNodeB or other node in a 3GPP network. FIG. 14 is a schematic illustration of a node 1601 in which a method embodying any of the presently described network-based techniques can be implemented. A computer program for controlling the node 1601 to carry out a method embodying the present invention is stored in a program storage 1630, which comprises one or several memory devices. Data used during the performance of a method embodying the present invention is stored in a data storage 1620, which also comprises one or more memory devices. During performance of a method embodying the present invention, program steps are fetched from the program storage 1630 and executed by a Central Processing Unit (CPU) 1610, retrieving data as required from the data storage 1620. Output information resulting from performance of a method embodying the present invention can be stored back in the data storage 1620, or sent to an Input/Output (I/O) interface 1640, which includes a network interface for sending and receiving data to and from other network nodes and which may also include a radio transceiver for communicating with one or more terminals.

Accordingly, in various embodiments of the invention, processing circuits, such as the CPU 1610 and memory circuits 1620 and 1630 in FIG. 14, are configured to carry out one or more of the techniques described in detail above. Likewise, other embodiments may include radio network controllers including one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

In some embodiments, input/output interface 1640 may send and receive S1 messages and/or X2 messages. CPU 1610 may provide and/or retrieve information about previous handovers to/from the X2 and S1 messages. Data storage 1620 may store information about neighbor cells, cell relations, mobility thresholds, causes of movements of UEs and peer network nodes.

It will be appreciated by the person of skill in the art that various modifications may be made to the above described embodiments without departing from the scope of the present invention. For example, although embodiments of the present invention have been described with examples that include a communication system compliant to the 3GPP specified LTE standard specification, it should be noted that the solutions presented may be equally well applicable to other radio access technologies. The specific embodiments described above should therefore be considered exemplary rather than limiting the scope of the invention. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

In the above-description, the terminology used is for the purpose of describing particular embodiments only and is not intended to be limiting. Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present disclosure. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, some embodiments may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the disclosure. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present disclosure. All such variations and modifications are intended to be included herein within the scope of present disclosure. Accordingly, the above disclosed subject matter is to be considered illustrative, and not restrictive, and the appended examples of embodiments are intended to cover all such modifications, enhancements, and other embodiments, which fall within the spirit and scope of present disclosure. Thus, the scope of present disclosure are to be determined by the broadest permissible interpretation of the present disclosure, and shall not be restricted or limited by the foregoing detailed description.

The invention claimed is:

1. A first network node for use in a wireless network, the first network node being adapted to:
    forward information on movements of a wireless device to a second network node over an interface for a handover (HO) signalling; wherein the information on movements is represented by a HO cause value in a first field that uses an interface-dependent encoding and a HO cause value in a second field that uses an interface-independent encoding.

2. A first network node as claimed in claim 1, wherein the HO cause value in the first field is encoded according to the type of interface that the information is forwarded over.

3. A first network node as claimed claim 1, wherein the HO cause value in the second field is encoded using the same type of encoding regardless of the type of interface that the information is forwarded over.

4. A first network node as claimed in claim 3, wherein the HO cause value in the first field is encoded according to a first type of encoding when the information on movements is forwarded over a first type of interface and the HO cause value in the first field is encoded according to a second type of encoding when the information on movements is forwarded over a second type of interface.

5. A first network node as claimed in claim 4, wherein the HO cause value in the second field is encoded using one of the first and second type of encoding regardless of the type of interface that the information is forwarded over.

6. A first network node as claimed in claim 5, wherein the first network node is adapted to omit the second field when the Information on movements is forwarded over the type of interface having said type of encoding that is used to encode the HO cause value in the second field.

7. A first network node as claimed in claim 4, wherein the HO cause value in the second field is encoded using a different type of encoding to the first and second types of encoding.

8. A first network node as claimed claim 1, wherein the first network node is a network node in a radio access network, RAN, part of the wireless network and the second network node is another network node in the RAN or a network node in a core network part of the wireless network.

9. A first network node as claimed in claim 1, wherein the first network node is a network node in a core network part of the wireless network and the second network node is a network node in a radio access network, RAN, part of the wireless network.

10. A first network node as claimed in claim 1, wherein the interface-independent encoding is the encoding used on one of an X2 interface and an S1 interface.

11. A first network node as claimed in claim 1, wherein the interface-independent encoding is the encoding used on an X2 interface.

12. A first network node as claimed in claim 1, wherein the first field is an HO Cause Value field in a Last Visited E-UTRAN Cell Information IE and the second field is a second HO Cause Value field in the Last Visited E-UTRAN Cell Information IE.

13. A first network node as claimed in claim 1, wherein the information is forwarded in an X2 HO REQUEST message, an S1 HO REQUIRED message or an S1 HO REQUEST message.

14. A method of operating a first network node in a wireless network, the method comprising;
    forwarding information on movements of a wireless device to a second network node over an interface for a handover (HO) signalling; wherein the information on movements is represented by a HO cause value in a first field that uses an interface-dependent encoding and a HO cause value in a second field that uses an interface-independent encoding.

15. A method as claimed in claim 14, wherein the HO cause value in the first field is encoded according to the type of interface that the information is forwarded over.

16. A method, as claimed in claim 14, wherein the HO cause value in the second field is encoded using the same type of encoding regardless of the type of interface that the information is forwarded over.

17. A second network node for use in a wireless network, the second network node being adapted to:
    receive information on movements of a wireless device from a first network node over an interface for a handover (HO) signalling; wherein the information on movements is represented by a HO cause value in a first field that uses an interface-dependent encoding and a HO cause value in a second field that uses an interface-independent encoding.

18. A second network node as claimed in claim 17, wherein the HO cause value in the first field is encoded according to the type of interface that the information is received over.

19. A second network node as claimed in claim 17, wherein the HO cause value in the second field is encoded using the same type of encoding regardless of the type of interlace that the information is received over.

20. A second network node as claimed in claim 17, wherein the HO cause value in the first field is encoded according, to a first type of encoding when the information on movements is received over a first type of interface and the HO cause value in the first field is encoded according to a second type of encoding when the information on movements is received over a second type of interface.

21. A method of operating a second network node in a wireless network, the method comprising:
    receiving information on movements of a wireless device from a first network node over an interface for a handover (HO) signalling; wherein the information on movements is represented by a HO cause value in a first field that uses an interface-dependent encoding and a HO cause value in a second field that uses an interface-independent encoding.

* * * * *